United States Patent [19]

Banks

[11] 4,390,892
[45] Jun. 28, 1983

[54] TV SYNC GENERATOR SYSTEM FOR PAL STANDARDS

[75] Inventor: Arthur J. Banks, Cherry Hill, N.J.

[73] Assignee: RCA Corporation, New York, N.Y.

[21] Appl. No.: 313,163

[22] Filed: Oct. 20, 1981

[30] Foreign Application Priority Data

Jan. 26, 1981 [GB] United Kingdom ............... 8102285

[51] Int. Cl.³ ........................................... H04N 9/44
[52] U.S. Cl. ..................................... 358/17; 358/150
[58] Field of Search ..................... 358/16, 17, 19, 150

[56] References Cited

U.S. PATENT DOCUMENTS 3,571,513  3/1971  Ward ................................... 358/150
4,268,852  5/1981  Nakamura ............................. 358/17
4,268,853  5/1981  Nakamura ............................. 358/17

FOREIGN PATENT DOCUMENTS 2041692  9/1980  United Kingdom .

Primary Examiner—John C. Martin
Attorney, Agent, or Firm—E. M. Whitacre; W. H. Meise; H. I. Steckler

[57] ABSTRACT

A sync generator system for PAL-B television features an offset subcarrier generator that provides an offset subcarrier signal that has phase steps of ninety degree magnitude and occur twice per field. This makes smoothing of a PLL error voltage relatively easy.

6 Claims, 8 Drawing Figures

(a) QUADRATURE SC GENERATOR-IDEALIZED (b) WAVEFORMS IN (a)

QUADRATURE SC GENERATOR-ACTUAL CIRCUIT

TV SYNC GENERATOR SYSTEM FOR PAL STANDARDS

BACKGROUND OF THE INVENTION

The present invention relates to a television synchronization generator, and more particularly, to one used in a portable color camera operating on PAL-B standards.

In PAL-B in order to minimize a visible dot crawl in the displayed picture, it is necessary to derive an offset subcarrier that differs from subcarrier frequency by a decrement of the frame frequency (25 Hz). This offset subcarrier is used as a reference to which scanning signal frequencies are locked in accordance with certain mathematical relationships.

A common method of deriving the offset subcarrier involves a pair of balanced modulator integrated circuits, driven by two subcarrier (SC) signals in quadrature phase with respect to each other and two frame frequency signals in quadrature phase with respect to each other. Subcarrier frequency signals are suppressed in the modulator outputs, leaving only sum and difference frequency signals. Outputs from the two modulators are combined in such a way that the sum frequency signals are cancelled and the difference frequency signals are added in phase. The resultant difference frequency of SC frequency minus frame frequency is the desired frequency for the offset subcarrier.

The waveforms driving the modulators are sinusoidal, requiring filters to derive them from the available rectangular waves. Phase shifting circuits are used to produce the required quadrature relationships. Finally, the sinusoidal offset subcarrier is squared by a limiter to make a suitable rectangular wave for driving a digital frequency divider. The number of parts and consequent space requirements, as well as power required, made it desirable to consider other approaches.

There are other approaches in the prior art, including a method that begins with a four times subcarrier frequency signal and involves periodic removal of cycles from this signal to form an offset frequency signal. This offset frequency is then divided down to line frequency. The pulse removal operation results in periodic phase step perturbations at the field rate that are 112 nanoseconds in magnitude. These perturbations must be smoothed out by a phase-lock loop including a clock oscillator, which produces the clock frequency signal for the sync pulse generator. The bandwidth of such a loop must be less than the field frequency (50 Hz), in order to achieve adequate smoothing. Such a narrow bandwidth precludes the loop from attenuating any 50 Hz crosstalk, such as from the power line or from the field frequency circuits, introduced into the clock oscillator or elsewhere into the phase-lock loop other than the reference input. It is desirable from this standpoint that any perturbations in the signal fed to a clock oscillator phase-lock loop be as small as possible and at as high a frequency as possible. These characteristics also mean that the lock up time can be minimized, since wider bandwidth makes faster lock up possible.

It is therefore desirable to provide a PAL synchronization generator which requires a minimum of components, has low power consumption, and has minimal phase perturbations in its outputs.

SUMMARY OF THE INVENTION

A PAL-B television synchronization generator comprises a reference signal generator that has a frequency of twice the color subcarrier. Further, an offset subcarrier signal is generated by imparting ninety degree phase delay steps at a rate of twice per field.

DESCRIPTION OF THE DRAWINGS

FIG. 2(a) shows an offset subcarrier generator used in FIG. 1, while

FIG. 4(a) shows an idealized quadrature subcarrier generator used in FIG. 1, while FIG. 4(b) shows waveforms therein;

FIG. 6(a) shows a quadrature frame rate square wave generator used in FIG. 1, while FIG. 6(b) shows waveforms therein.

Waveforms occur at points in the corresponding circuits having corresponding lettering.

DETAILED DESCRIPTION

Figure 1:
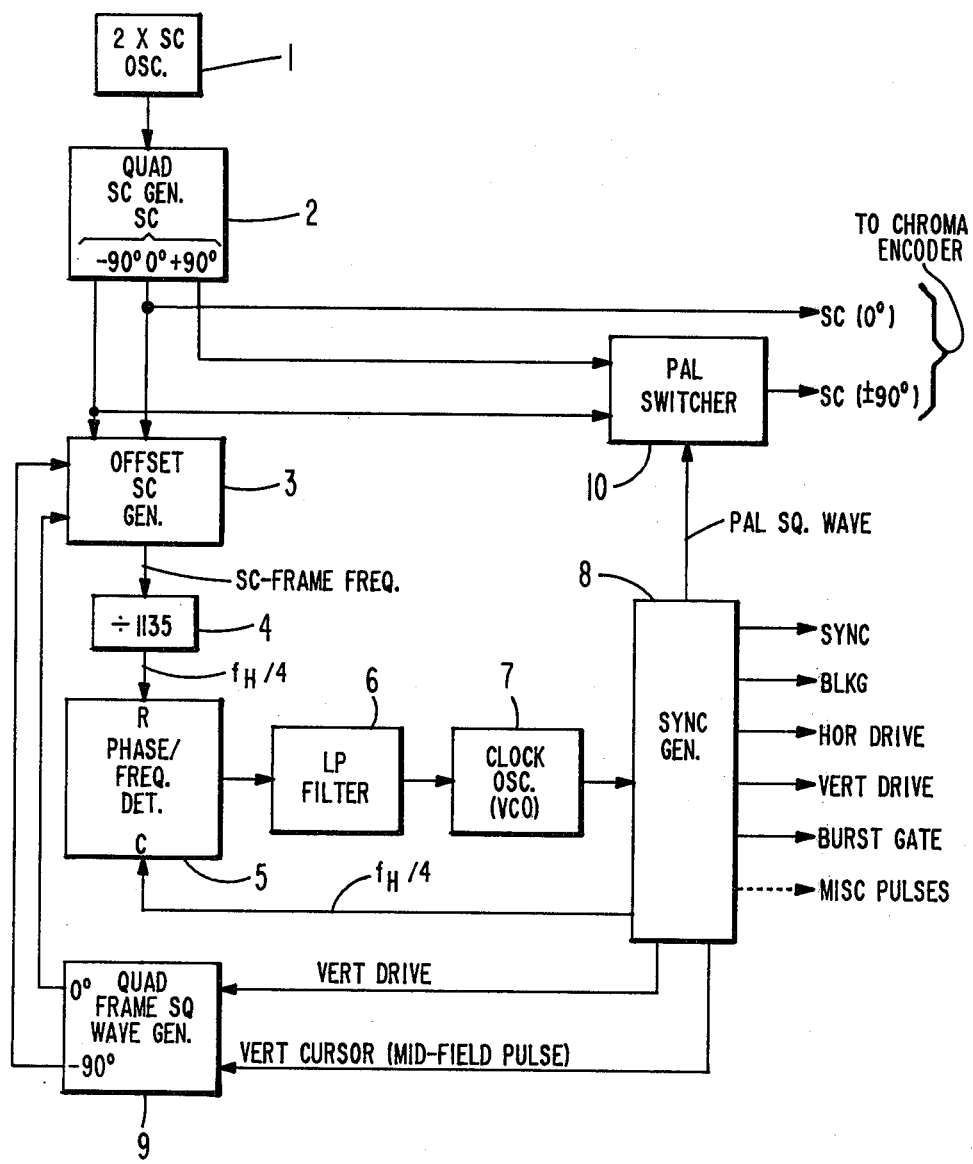
FIG. 1 is a block diagram of an embodiment of the invention.

An overall block diagram of the present invention is shown in FIG. 1. In this system a frequency of two times subcarrier (2×SC) is generated by crystal oscillator 1. The 2×SC signal is fed into quadrature subcarrier generator 2, which generator divides the frequency by 2 and provides three ninety degree related subcarrier signals in squarewave form and respectively labeled "−90°", "0°" and "+90°". The 0° subcarrier signal is applied to a chroma encoder (not shown) as a 0° phase reference signal. The +90° and −90° subcarrier signals from generator 2 are applied to a PAL switcher 10, which is controlled by a line alternating PAL square wave switching signal from a standard PAL sync generator 8. The output of switcher 10 is applied to said chroma encoder (not shown) and consists of alternate lines of subcarrier signals of +90° and −90° phases, as is required in the PAL system. The 0° and −90° phase signals from quadrature generator 2 are applied to the offset subcarrier generator 3. Here two 90° related squarewaves of frame frequency, which come from generator 9, are used to produce the offset subcarrier from the two 90° related subcarrier signals. This offset subcarrier is binary in nature, in that it has only two states, "high" and "low" (or 1 and 0). The offset subcarrier frequency is divided by 1135 in divider 4, resulting in an output frequency which is one fourth of the horizontal frequency (fh/4). A phase-lock loop is formed by elements 5, 6, 7 and 8. A phase/frequency detector 5 has a reference input R that receives the fh/4 signal from divider 4, and a controlled input C that receives an fh/4 signal from generator 8. The phase/frequency detector output is coupled to a low-pass filter 6. The low-pass filter 6 output signal controls the frequency of the clock oscillator 7 comprising a VCO (voltage controlled oscillator). The clock signal from this oscillator drives the sync generator 8, which produces numerous outputs required by the camera. Among these outputs is the above mentioned fh/4 signal, which becomes the controlled signal for the phase/frequency detector 5. The polarity sense of the voltage-controlled clock oscillator 7 is such that the frequency and phase of fh/4 from generator 8 are made to converge toward the frequency and phase, respectively, of the signal at reference input R of the phase/frequency detector 5. Two other outputs from sync generator 8, vertical drive (V DR) and vertical cursor (V CURSOR), which are field-rate waveforms that are essentially 180° apart in phase, are fed into the quadrature frame squarewave generator 9, which produces two 90°-related frame-rate squarewaves. These are required by the offset SC generator 3.

Figure 2A:
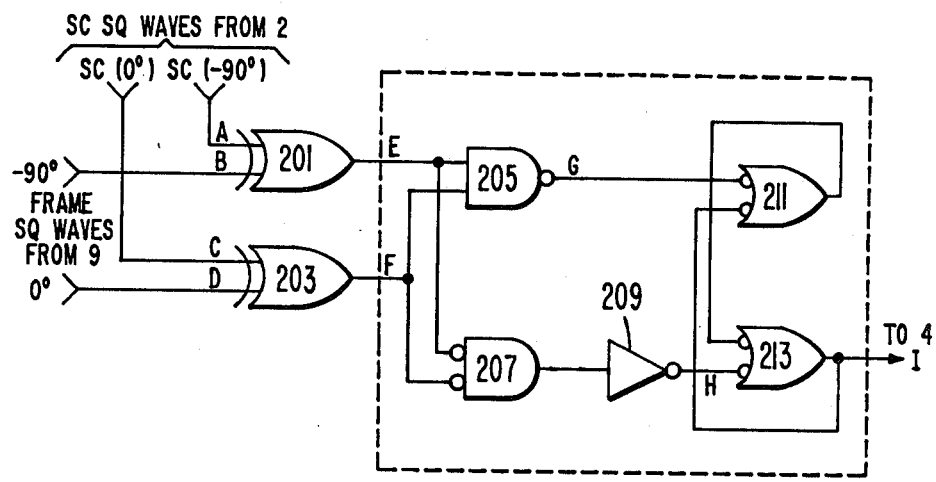
Figure 2B:
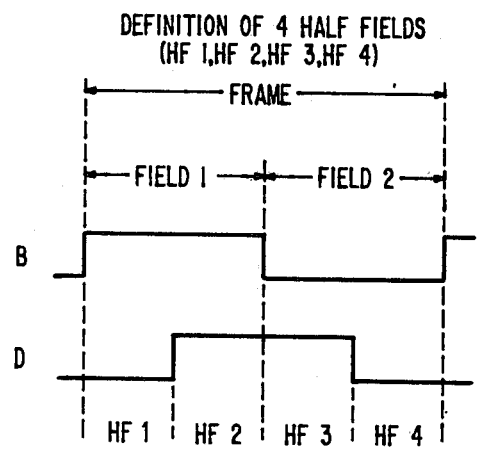
FIG. 2(b) shows some input waveforms for FIG. 2(a)
Figure 3:
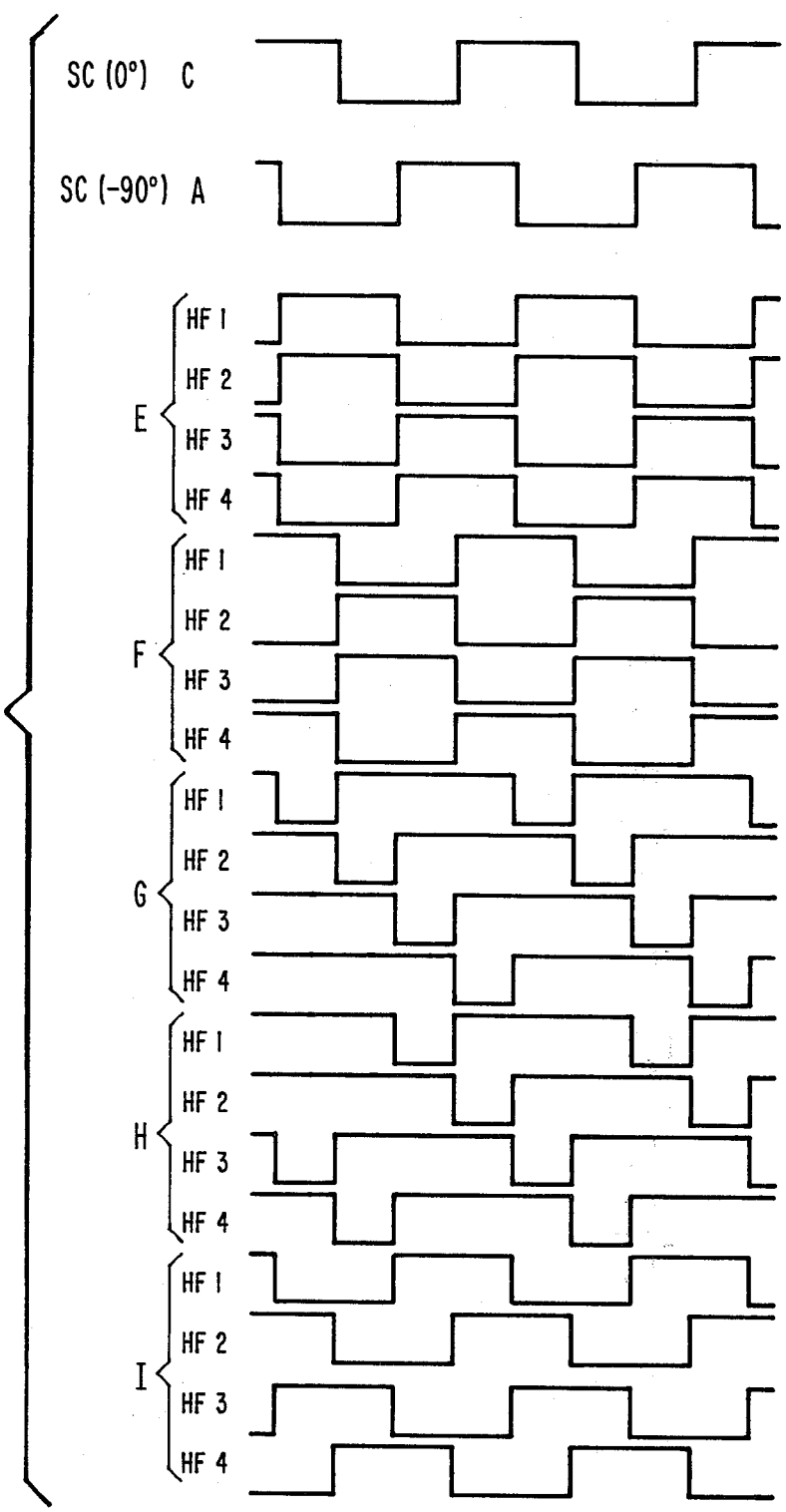
FIG. 3 shows more waveforms occurring in FIG. 2(a)

FIG. 2a shows the details of offset subcarrier generator 3 of FIG. 1. The −90° and 0° (minus sign indicating earlier phase) frame rate square waves from generator 9 are labelled B and D respectively and are applied to respective first inputs of XOR (exclusive OR) gates 201 and 203. Waveforms B and D are shown in FIG. 2b wherein taken together they define four half fields, HF1, HF2, HF3, and HF4. The −90° and 0° subcarrier rate square waves from generator 2 are labelled C and A respectively and applied to respective second inputs of gates 201 and 203. Waveforms C and A are shown at the top of FIG. 3. Assuming positive logic, if one input to an XOR gate is high, then the signal at the other input is reproduced in inverted form at the gate output. If one input is low, then the signal at the other input is reproduced at the gate output in non-inverted form. The output signals from gates 201 and 203 are respectively labelled E and F and are shown in FIG. 3 for the four half fields. Waveforms E and F are respectively applied to first and second inputs of NAND gate 205 and AND gate 207, gate 207 having inverting inputs. The output of AND gate 207 is coupled to inverter 209. The output signals from gate 205 and inverter 209 are labelled G and H respectively and are shown in FIG. 3. The signal G is low only when both signals E and F are high. Conversely, the output of gate 207 is high only when both signals E and F are low, and the output of gate 207 appears inverted as signal H at the output of inverter 209. Thus signal H is low whenever both signals E and F are low. The G and H signals are applied to inverting input cross-coupled OR gates 211 and 213, respectively, which gates 211 and 213 form an R-S (reset-set) flip-flop with low acting inputs, i.e., the active triggering states are low. When signal H is high and signal G is low, the output signal I from gate 213 and shown in FIG. 3 is low. When H is low and G is high, I is high. When both H and G are high there is no change in the output state. Since G and H are never low at the same time, the state of the I output for this condition can be ignored.

Note that the phase of the subcarrier waveform I shifts 90° later in each successive half field. In four half-fields the shifts total 360°, or one full cycle of the input subcarrier. This means that in two full fields, or one frame, there is one less cycle of this manufactured offset subcarrier than there are cycles of unmodified subcarrier. This is consistent with the definition of the required offset subcarrier, in which there must be 25 fewer cycles than there are cycles of unmodified subcarrier in one second, and therefore one less cycle in one twenty-fifth of a second, which is one frame period.

During a transition from one half field to the next, an extraneous pulse may be generated in the G or H waveform, but in no case does this cause an extraneous pulse to be produced in output waveform I, and therefore the offset frequency signal so generated has precisely one less cycle in four half fields than there are cycles of unmodified subcarrier in the same four half fields.

If desired, a Schmitt trigger circuit preceeded by a resistive summing matrix can be substituted for the elements enclosed by a dotted line in FIG. 2a. However it may be difficult to find one that satisfactorily operates at the 4.43 MHz subcarrier frequency.

Figure 4:
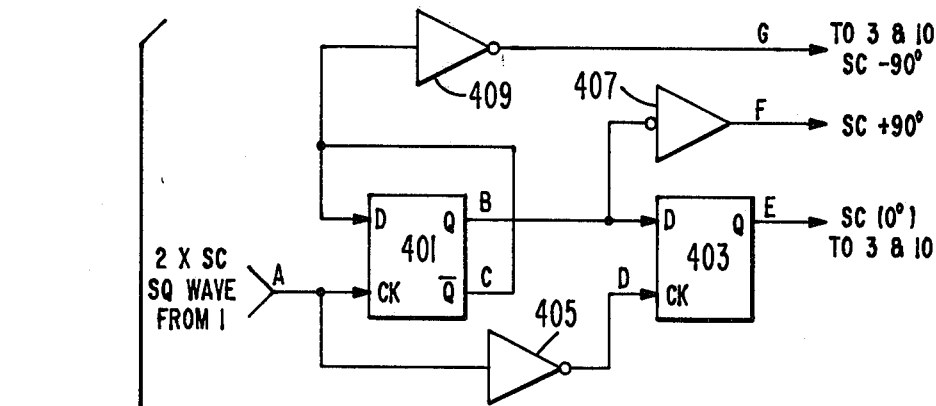
Figure 4:
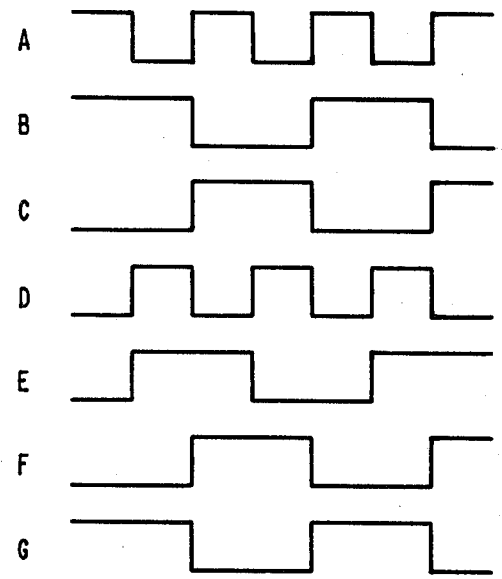

A more detailed diagram of the quadrature SC generator 2 of FIG. 2 is shown in FIG. 4(a) with waveforms shown in FIG. 4(b). The input A receives a signal from generator 1 having a frequency of twice the subcarrier frequency, which frequency is divided by two in the type D flip-flop 401. Flip-flop 401 is configured as a toggle by connecting its Q-output to its D-input. Therefore, a subcarrier frequency signal appears at outputs B and C, but in opposite phases. A second type D flip-flop 403 is clocked from 2×SC squarewave D which is of opposite phase with respect to signal A, due to inverter 405. The subcarrier squarewave signal from flip-flop 401 Q output (B) is fed into the D input of the flip-flop 403. Flip-flop 403 is clocked by waveform D, producing subcarrier frequency waveform E which is 90° delayed with respect to waveform B. Waveform B is also inverted by inverter 407 producing subcarrier frequency waveform F, which lags waveform E by 90° as indicated by a plus sign. Waveform C is inverted by inverter 409 producing waveform G, which leads waveform E by 90°.

Figure 5:
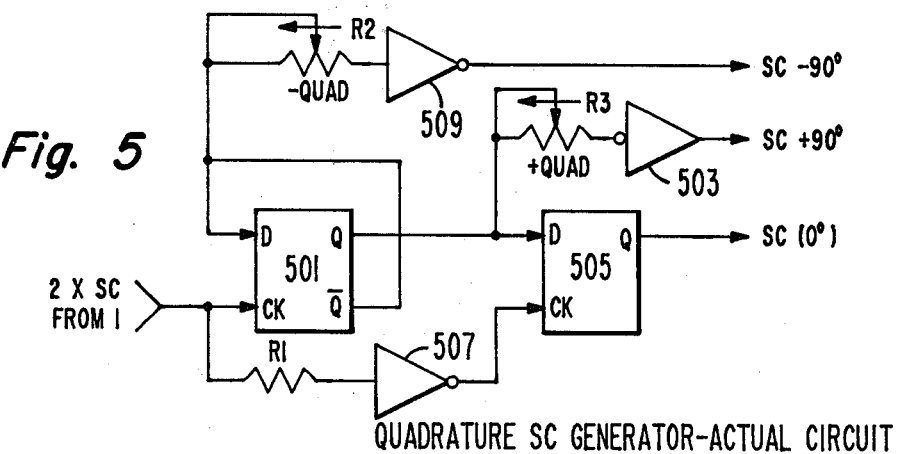
FIG. 5 shows an actual quadrature subcarrier generator circuit used in FIG. 1.

The foregoing description assumes a perfectly symmetrical input squarewave A and ignores propagation delays. In practice, propagation delays cannot be ignored, and a perfectly symmetrical input cannot be assumed. It becomes desirable to insert certain compensating delays which permit obtaining the desired 90° relationships among the three outputs. FIG. 5 shows an actual circuit, in which the logic devices are CMOS types. The three resistors R1, R2 and R3 form delay networks with the input capacitances of the inverters which they feed. Resistor R1 is inserted to compensate for a nominal setting of the two variable resistors R2 and R3, and also to allow for the possibility of an input waveform that has somewhat less than a fifty percent duty cycle. Note that resistor R1 affects the phase of the subcarrier 0° output only. The +QUADϕ (phase) control resistor R3 permits trimming the phase of the subcarrier +90° output to be precisely 90° behind the subcarrier 0° output. The overall delay from the positive transition of the 2×SC input signal to the subcarrier +90° output includes a flip-flop 501 and an inverter 503. Likewise, the overall delay from the negative transition of the 2×SC input to the SC 0° output includes a flip-flop 505 and an inverter 507. The two inverters 503 and 507 involved are in the same IC (integrated circuit) package, and the two flip-flops involved 501 and 505 are also in a common IC package. Therefore, a temperature change on either or both packages will have similar effects on the delays to both outputs and, consequently, minimal effect on the phase relation between them.

Now the effect of duty cycle of the 2×SC square wave input in FIG. 5 will be examined. Since flip-flop 501 is clocked by positive transitions and flip-flop 505 is clocked by negative transitions from the 2×SC input (as inverted by inverter 507), the duty cycle of that input affects the phase relationship between the subcarrier 0° output and the other outputs. By making resistor R1 larger than might otherwise be required, we can compensate for a less-than fifty percent duty cycle of the 2×SC input. Greater than fifty percent duty cycle requires that the upper limit of the range of resistor R3 be extended correspondingly.

The trimmer resistor R2 serves a similar function in the path to the subcarrier −90° output to that served by resistor R3 in the path to the +90° output. Its setting can also correct for any differential there might be between propagation delays in flip-flop 501 from clock input to its Q and Q̄ outputs. Temperature tracking of the SC −90° output with the SC +90° and SC 0° outputs is enhanced by including inverter 509 in the same IC package as inverters 503 and 507.

Figure 6:
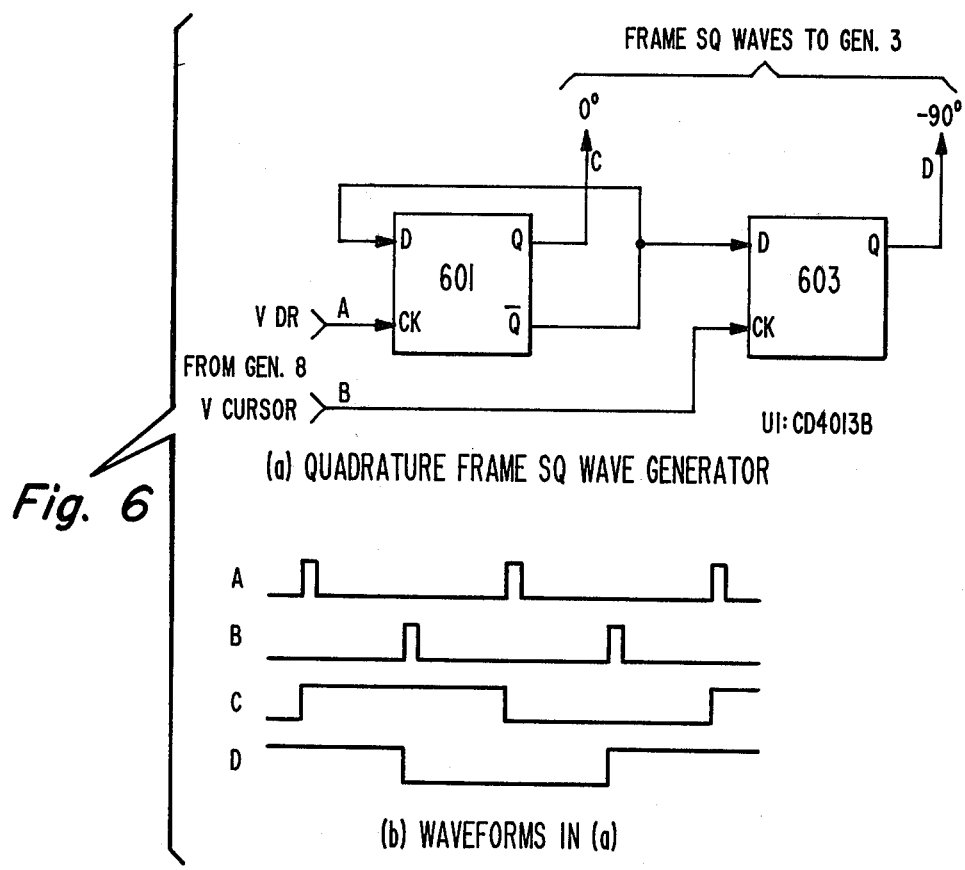

FIG. 6(a) illustrates the circuit for the quadrature frame squarewave genrator 9 of FIG. 1. Generator 9 comprises two type-D flip-flops 601 and 603. Flip-flop 601 is connected as a toggle, serving as a divide-by-two frequency divider. In flip-flop 603 the Q output from flip-flop 601 is reclocked by the V CURSOR signal labelled "B". The input and output waveform relationships are shown in FIG. 6(b). The fact that the V CURSOR input occurs in the middle of a field produces the 90° relationship between the output squarewaves.

A CD4046 integrated circuit manufactured by RCA is used for the phase/frequency detector 5 in FIG. 1. The CD4046 contains two forms of phase comparators and a voltage controlled oscillator, but the embodiment of this invention uses only phase comparator II from that package. This comparator looks at only the positive transitions in its reference (R) and controlled (C) signal inputs. It is properly called a phase/frequency detector, because it has both phase and frequency properties. If there is a frequency difference between its input signals, the output is a continuous high or low level, depending upon whether the frequency difference (R minus C signal frequencies) is positive or negative, respectively. If there is no frequency difference, the output signal becomes a series of pulses with widths proportional to the phase difference between the signals at the R and C inputs. If the phase of R leads the phase of C, the output signal is a series of positive pulses with widths equal to the phase difference. If R lags C, the output is a series of negative pulses with widths equal to the phase difference. The output stage of the device is a three-state configuration, which means that if no pulse or high or low level is present on the output, it has a high impedance. If the phase of C is the same as R, the output goes to this high impedance state.

The phase-lock loop of FIG. 1, which is comprised of elements 5, 6, 7 and a portion of generator 8, must smooth the phase steps that occur in the output of divider 4 due to the 90° phase steps that occur once each half-field in the offset subcarrier from generator 3. Since the purpose of the offset subcarrier in the first place is to minimize the visual effects of the dot structure of color subcarrier in the picture, this smoothing must be done adequately for this purpose. This means that the bandwidth of the low-pass filter 6 must be sufficiently narrow. This narrow band requirement gives rise to the use of a phase/frequency detector for detector 5. Such a detector, when fed two frequencies that are not the same, does not produce a beat, or difference, frequency at its output such as an ordinary phase detector does. The ordinary phase detector will impose on the loop a frequency capture range which will relate to the bandwidth of the filter. For example, if the frequency difference is outside of the band of the low-pass filter, the loop will never lock up. On the other hand, the phase/frequency detector will have a DC output in the presence of a frequency difference, which will cause the controlled frequency to converge toward the reference frequency regardless of the filter bandwidth. The capture range of this system is limited only by the range over which the oscillator will work and the range of DC available to it. Therefore, it is possible to make the bandwidth of the filter as narrow as necessary to do the required smoothing without having to use a crystal oscillator to keep the frequency difference small enough to be always within the capture range of the loop. The main consequence of narrowing the bandwidth to do the required smoothing is to increase the lock-up time, and in this application lock-up time is not particularly restrictive. For instance, the disturbance being smoothed occurs every half-field, or 100 times per second, and it would be reasonable to take several seconds for lock-up.

Figure 7:
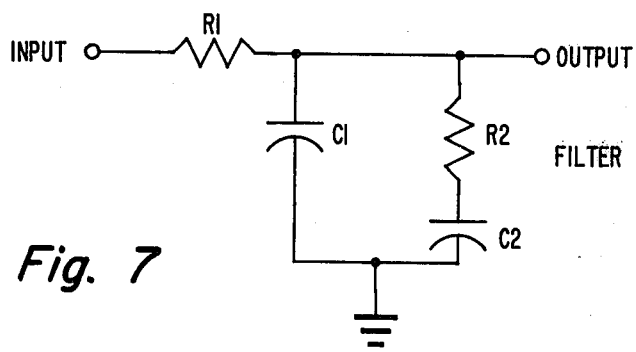
FIG. 7 shows a filter used in FIG. 1.

FIG. 7 shows the circuit configuration of filter 6 used in an embodiment of the invention.

Note that the offset subcarrier generator 3 in FIG. 1 utilizes two phase quadrature subcarrier signals that have to be produced anyway for the chroma encoder. This represents an efficiency of design that is one of the features of this invention.

One of the common apprehensions about the use of a phase/frequency detector in a phase-lock loop is its susceptibility to noise. It is important to note here that noise is not a problem, because the reference input to the detector 5 comes from on-board circuits and not an external source.

What is claimed is:

1. A PAL television synchronization generator system comprising a quadrature subcarrier generator having an input for receiving a reference frequency signal and an output means for providing a pair of quadrature phase related subcarrier signals; an offset subcarrier generator having an input coupled to said quadrature generator output means and an output means for providing a subcarrier signal that is frequency offset with respect to said quadrature subcarrier signals and having phase steps of ninety degrees of the subcarrier signal occurring twice per field; and a phase locked loop having an error signal and coupled to said offset subcarrier generator output means; whereby said error signal in said phase locked loop is easily filtered.

2. A system as claimed in claim 1, further comprising a source of quadrature frame rate signals, and wherein said offset subcarrier generator comprises a pair of exclusive OR gates each having first and second inputs and an output, said first inputs respectively receiving said quadrature subcarrier signals, said second inputs respectively receiving said quadrature frame rate signals, and a trigger circuit coupled to said outputs.

3. A system as claimed in claim 2, wherein said trigger circuit comprises a NAND gate and an inverting input AND gate, each of said gates having a first input coupled to one of said exclusive OR gate outputs, a second input coupled to the remaining exclusive OR gate output, and an output; an inverter coupled to said AND gate output; and a flip-flop coupled to said inverter and said NAND gate output.

4. A system as claimed in claim 1, wherein said reference signal has a frequency of twice the subcarrier frequency.

5. A system as claimed in claim 1, wherein said quadrature subcarrier generator further comprises another output means for providing a third subcarrier signal in phase quadrature with respect to one of said pair of quadrature phase related subcarrier signals, and further comprising a PAL switcher having a pair of inputs for respectively receiving one of said pair of quadrature phase related subcarrier signals and said third subcarrier signal and an output means for providing the signals at said inputs in line alternate fashion, the remaining one of subcarrier signals and the output signal from said PAL switcher being adapted to be respectively coupled to a chroma encoder.

6. A system as claimed in claim 1, wherein said phase locked loop comprises a phase and frequency detector, a low pass filter coupled to said detector, a clock oscillator coupled to said filter, and a synchronization generator circuit coupled to said clock oscillator and said detector.

* * * * *